(12) United States Patent
Higashikubo et al.

(10) Patent No.: US 6,335,490 B1
(45) Date of Patent: *Jan. 1, 2002

(54) INSULATING MATERIAL FOR COAXIAL CABLE, COAXIAL CABLE AND METHOD FOR PRODUCING COAXIAL CABLE

(75) Inventors: Takashi Higashikubo; Toshihiro Zushi; Hirokazu Kuzushita; Tamotsu Kaide, all of Amagasaki (JP)

(73) Assignee: Mitsubishi Cable Industries, Ltd., Amagasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/659,669

(22) Filed: Jun. 5, 1996

(30) Foreign Application Priority Data

Jun. 7, 1995 (JP) .............................................. 7-140785

(51) Int. Cl.$^7$ ................................................ H01B 7/00
(52) U.S. Cl. .............................. 174/110 F; 174/110 FC
(58) Field of Search ......................... 174/110 F, 110 R, 174/110 PM, 110 V, 110 FC, 36

(56) References Cited

U.S. PATENT DOCUMENTS

| | | | | |
|---|---|---|---|---|
| 3,132,116 A | * | 5/1964 | Wilkus | 260/41 X |
| 3,968,463 A | * | 7/1976 | Boysen | 174/110 F X |
| 3,975,473 A | * | 8/1976 | Mulvaney | 264/23 X |
| 4,104,481 A | * | 8/1978 | Wilkenloh et al. | 174/110 F X |
| 4,258,142 A | * | 3/1981 | Ohzeki et al. | 525/2 X |
| 4,894,488 A | * | 1/1990 | Gupta | 174/110 FC X |
| 4,973,626 A | * | 11/1990 | Wilkus et al. | 525/104 X |
| 5,468,782 A | * | 11/1995 | Mehan | 521/134 X |
| 5,574,074 A | * | 11/1996 | Zushi et al. | 521/143 |
| 5,614,319 A | * | 3/1997 | Wessels et al. | 174/100 FC X |

FOREIGN PATENT DOCUMENTS

| | | |
|---|---|---|
| JP | 2-279739 | 11/1990 |
| JP | 3-64335 | 3/1991 |

* cited by examiner

Primary Examiner—Chau N. Nguyen
(74) Attorney, Agent, or Firm—Leydig, Voit & Mayer, Ltd.

(57) ABSTRACT

An insulating material for coaxial cables, made at least in part with a polyolefin resin capable of heat-melt extrusion and a fluororesin powder as a nucleator, which material being capable of foam extrusion in the presence of a foaming agent; a coaxial cable made at least in part with a foam insulating layer prepared from the insulating material; and a method for producing a coaxial cable, by extruding, on a conductor, the insulating material to form a foam insulating layer. The insulating material for coaxial cables of the present invention containing a fluororesin powder such as PTFE as a nucleator provides a foamed article having fine and uniform cells, and a high expansion ratio. Such foamed article is superior in electric properties, and the coaxial cable having such insulating layer is superior in attenuation property. The material of the invention can obviate drying of the insulating layer, which contributes to an improved production efficiency of the coaxial cable and reduced production cost. In addition, the insulating material of the present invention is beneficially economical.

9 Claims, 1 Drawing Sheet

INSULATING MATERIAL FOR COAXIAL CABLE, COAXIAL CABLE AND METHOD FOR PRODUCING COAXIAL CABLE

FIELD OF THE INVENTION

The present invention relates to an insulating material for coaxial cables, a coaxial cable having a foam insulating layer obtained from said material, and a method for preparing said coaxial cable. More particularly, the present invention relates to an insulating material preferably used for forming a foam insulating layer of coaxial cables, a coaxial cable having a foam insulating layer prepared from said material, and a method for producing said cable.

BACKGROUND OF THE INVENTION

Traditionally, insulating wires having a foam insulating layer on conductors, which is formed by foam extrusion of a polymer composition, have been widely used.

The polymer composition used for such foam extrusion comprises, for example, a polyolefin resin such as polyethylene, a thermally decomposable compound such as 4,4'-oxybisbenzenesulfonylhydrazide (OBSH) and azodicarbonamide (ADCA) as a nucleator, and a foaming agent such as chlorofluorocarbon.

When a composition containing a polyolefin resin and OBSH as a nucleator is used, however, water is produced during thermal decomposition of OBSH and remains in foamed articles, which in turn adversely affects transmission performance and the like. To avoid this, the obtained foam insulating layers need to be dried by, for example, vacuum drying, which is problematic from industrial aspects.

When a composition containing ADCA as a nucleator is used, moreover, a residue from thermal decomposition of ADCA, such as biurea, cyanuric acid and urazol, is produced to cause dielectric loss in high frequency regions due to the polarization thereof, which noticeably increases the dissipation factor (hereinafter to be referred to as tan δ of the obtained foam insulating layer, thereby degrading the electric property of the insulating layer. The decomposition residue also causes high water absorption of the foam insulating layer, and the foamed article therefore requires storage in a low humidity atmosphere.

Japanese Patent Unexamined Publication No. 348141/1992 discloses a composition for foam extrusion which comprises a base resin containing a polyolefin resin capable of heat-melt extrusion, and a low polarity boron compound powder non-decomposable at a foaming temperature as a nucleator.

Japanese Patent Application No. 12983/1995 discloses a composition for foam extrusion which comprises a base resin containing a polyolefin resin capable of heat-melt extrusion and a specific boron nitride as a nucleator.

The composition containing boron nitride provides a foamed article far superior to foamed articles obtained by conventional foamable compositions containing a known nucleator such as ADCA, in various properties, specifically electric property (e.g., tan δ). Yet, such foamed article also has defects in that it has larger cell diameter than in the foamed articles obtained from conventional materials to disqualify itself for such use as requires mechanical strength or hardness, and that it is costly.

Japanese Patent Unexamined Publication Nos. 279739/1990 and 64335/1991 teach a method for producing a foamed article which comprises heating a mixture of a thermoplastic resin and a fluorocarbon powder or a nucleator for plasticization, and adding a foaming agent.

The above-mentioned two gazettes relate to a foamed article for thermal insulation and do not suggest a foamable composition (insulating material) suitable for forming a foam insulating layer of coaxial cables, which is capable of producing a foamed article particularly superior in electric properties, and a coaxial cable having an insulating layer obtained from said composition.

It is therefore an object of the present invention to provide an insulating material for economical coaxial cables, which is capable of producing foamed articles having fine and uniform cells and a high expansion ratio, and which obviates drying steps of foamed articles.

Another object of the present invention is to provide a coaxial cable having an insulating layer superior in electric properties, which layer being obtained from said insulating material.

A still another object of the present invention is to provide a method for producing the above-mentioned coaxial cable.

SUMMARY OF THE INVENTION

According to the present invention, there have now been provided the following insulating materials (1)–(6) for coaxial cables, coaxial cables (7)–(12), and a method (13) for producing coaxial cables.

(1) An insulating material for coaxial cables, comprising a polyolefin resin capable of heat-melt extrusion, and a fluororesin powder as a nucleator, which material being capable of foam extrusion in the presence of a foaming agent.

(2) The insulating material of the above (1), further comprising a foaming agent.

(3) The insulating material of the above (1) or (2), wherein the polyolefin resin is a high density polyethylene, a low density polyethylene or a mixture of a high density polyethylene and a low density polyethylene.

(4) The insulating material of any one of the above (1) to (3), wherein the fluororesin powder is a member selected from the group consisting of polytetrafluoroethylene powder, tetrafluoroethylene-perfluoroalkylvinylether copolymer powder and ethylene-tetrafluoroethylene copolymer powder.

(5) The insulating material of any one of the above (1) to (4), wherein the fluororesin powder is added in a proportion of 0.01–10 parts by weight relative to 100 parts by weight of the polyolefin resin.

(6) The insulating material of any one of the above (1) to (5), wherein an average particle size of the fluororesin powder is 0.1–100 μm.

(7) A coaxial cable comprising a foam insulating layer prepared from an insulating material for coaxial cables, which material comprising a polyolefin resin capable of heat-melt extrusion and a fluororesin powder as a nucleator, and being capable of foam extrusion in the presence of a foaming agent.

(8) The coaxial cable of the above (7), wherein the insulating material for coaxial cable contains a foaming agent.

(9) The coaxial cable of the above (7) or (8), wherein the polyolefin resin is a high density polyethylene, a low density polyethylene or a mixture of a high density polyethylene and a low density polyethylene.

(10) The coaxial cable of any one of the above (7) to (9), wherein the fluororesin powder is a member selected from the group consisting of polytetrafluoroethylene powder, tetrafluoroethylene-perfluoroalkylvinyl-ether copolymer powder and ethylene-tetrafluoroethylene copolymer powder.

(11) The coaxial cable of any one of the above (7) to (10), wherein the fluororesin powder is added in a proportion of 0.01–10 parts by weight relative to 100 parts by weight of the polyolefin resin.

(12) The coaxial cable of any one of the above (7) to (11), wherein an average particle size of the fluororesin powder is 0.1–100 µm.

(13) A method for producing a coaxial cable, comprising extruding, on a conductor, a composition comprising a polyolefin resin capable of heat-melt extrusion, and a fluororesin powder as a nucleator, in the presence of a foaming agent to form a foam insulating layer.

DETAILED DESCRIPTION OF THE INVENTION

Figure 1:
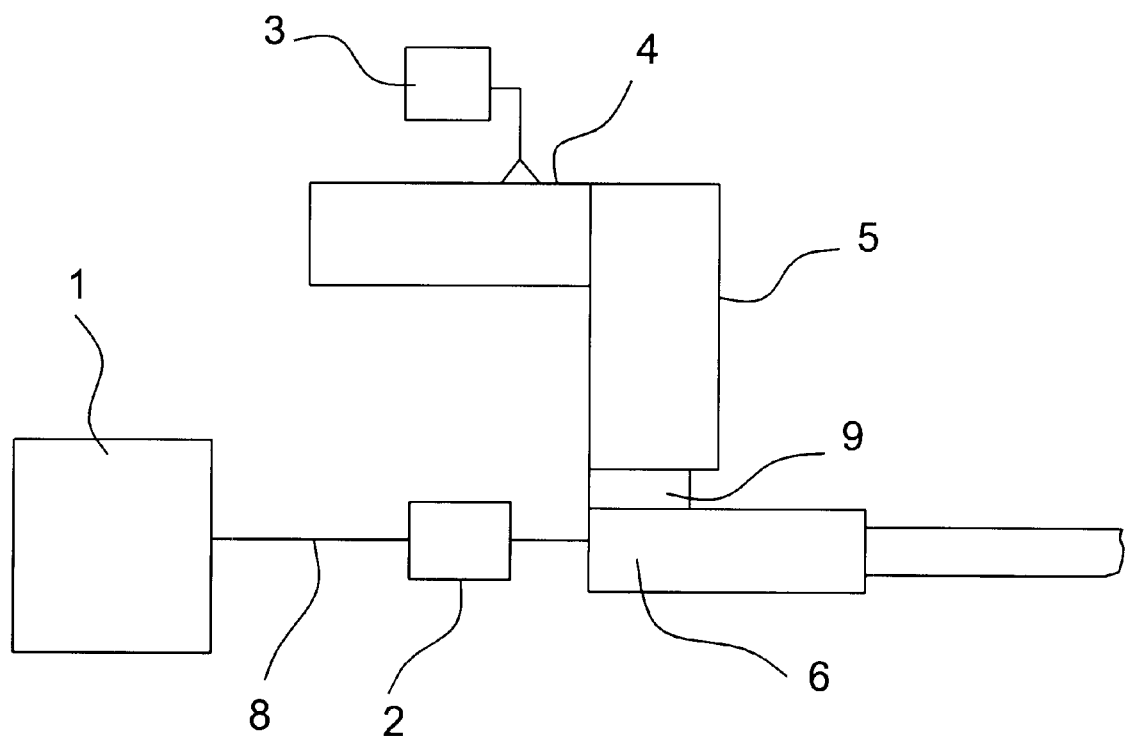
FIG. 1 shows one embodiment of the production apparatus of the coaxial cable of the present invention, wherein 1 is a conductor supply device, 2 is a preliminary heater, 3 is a pump, 4 is a primary extruder, 5 is a secondary extruder, 6 is a die, 8 is a conductor and 9 is an extruder head.

The insulating material of the present invention comprises, as a base resin, a polyolefin resin capable of heat-melt extrusion.

Examples of the polyolefin resin capable of heat-melt extrusion include polyethylenes [e.g., high density polyethylene (HDPE), middle density polyethylene (MDPE), low density polyethylene (LDPE), and a mixture of HDPE and LDPE], polypropylene, and propylene-ethylene copolymer wherein propylene and ethylene have been randomly or block copolymerized. In particular, polyethylene, specifically HDPE and a mixture of HDPE and LDPE, are preferably used for superior expansion ratio. The proportion of HDPE and LDPE in the mixture of HDPE and LDPE is generally 10–900 parts by weight, preferably 12.5–400 parts by weight, and more preferably 100–400 parts by weight of LDPE relative to 100 parts by weight of HDPE.

As used herein, LDPE means those having a density of not less than 0.910 g/cm$^3$ and not more than 0.925 g/cm$^3$; MDPE means those having a density exceeding 0.925 g/cm$^3$ and not more than 0.940 g/cm$^3$; and HDPE means those having a density exceeding 0.940 g/cm$^3$ and not more than 0.965 g/cm$^3$.

The preferable range of melt flow rate (hereinafter to be abbreviated as MFR) of the polyolefin resin to be used in the present invention is, for example, 0.5–10 g/10 min, preferably 0.6–8 g/10 min for polyethylene, and 1–20 g/10 min, preferably 1.5–15 g/10 min for polypropylene, wherein MFR is determined according to JIS K 7210. The determination conditions are load 2.16 kg, temperature 190° C. for polyethylene and load 2.16 kg, temperature 230° C. for polypropylene.

The base resin may contain, besides the above-mentioned polyolefin resin, other resins such as polystyrene to the extent that the accomplishment of the object of the present invention is not prevented. When other resins are added, the content thereof is preferably not more than 20% by weight of the base resin.

In the present invention, fluororesin powder is used as a nucleator of the insulating material for coaxial cable.

Examples of the fluororesin powder include, but not limited to, powders of polytetrafluoroethylene (PTFE), tetrafluoroethylene-perfluoroalkylvinylether copolymer (PFA), ethylene-tetrafluoroethylene copolymer (ETFE), tetrafluoroethylene-hexafluoropropylene copolymer (FEP), tetrafluoroethylene-ethylene copolymer, polyvinylidene fluoride (PVdF), polychlorotrifluoroethylene (PCTFE) and chlorotrifluoroethylene-ethylene copolymer (ECTFE), with preference given to PTFE powder, PFA powder and ETFE powder, and particular preference given to PTFE powder.

The average particle size of the fluororesin powder is not particularly limited, but it is preferably 0.1–100 µm, more preferably 0.5–50 µm in terms of uniformity of the cell and expansion ratio.

The average particle size is determined by laser beam diffraction method (microtrack particle size analyzer). The particle size is determined by adding about 100 mg of a test sample (fluororesin powder) in an ethanol/water (1:1) solution, uniformly dispersing same in an ultrasonic washer (28 kHz) for 5 minutes, and subjecting the dispersion to the determination by a Laser Granulometer Model 715 (CILAS).

While the shape of the fluororesin powder is not particularly limited, it is preferably spherical to achieve better uniformity of the cell and desired expansion ratio.

The content of the fluororesin powder is subject to no particular limitation, but it is preferably 0.01–10 parts by weight, more preferably 0.02–0.2 part by weight, relative to 100 parts by weight of the base resin. When the content of the fluororesin powder is within this range, a formed article can have good appearance, a high expansion ratio and a suitable cell size.

It is possible to add a nucleator other than fluororesin powder, which is conventionally known in the pertinent field, to the extent that the characteristic features of the present invention are not impaired. Examples of such nucleator include fine powder of inorganic compound such as boron nitride, alumina, zirconia and talc, and organic foamable compound such as ADCA and OBSH. When a nucleator other than fluororesin powder is used, the content thereof is preferably not more than 50% by weight of the nucleator as a whole.

The foaming agent may be appropriately selected depending on the forming temperature, foaming conditions, method of foaming and the like. For example, a complete foam insulating layer is to be prepared simultaneously with forming, an inert gas may be used, such as nitrogen, carbon gas, helium and argon; hydrocarbon such as methane, propane, butane and pentane; and halogenated hydrocarbon such as dichlorodifluoromethane, dichloromonofluoromethane, monochlorodifluoromethane, trichloromonofluoromethane, monochloropentafluoroethane and trichlorotrifluoroethane.

Of these foaming agents, chlorofluorocarbon containing hydrogen atom (e.g., HCFC 22, HCFC 123, HCFC 124 and HCFC 142b), fluorocarbon without chlorine atom, and inert gas such as nitrogen, hydrocarbon gas and argon, are particularly preferable, since they can afford foamed articles having uniform and fine cells and a high expansion ratio. Being nondestructive to the ozon layer, they are also desirable from the aspects of environmental protection. Particularly preferred is argon.

While the content of the foaming agent is not particularly limited, it is generally 0.2–20 parts by weight, preferably 0.5–10 parts by weight, relative to 100 parts by weight of the base resin.

The insulating material of the present invention may contain copper inhibitor, antioxidant and coloring agent on demand. The content of such additive is preferably 0.05–2.0 parts by weight, more preferably 0.1–1.0 part by weight, relative to 100 parts by weight of the base resin.

The insulating material of the present invention is treated in the presence of a foaming agent when being delivered onto a conductor by extrusion of the material for forming an insulating layer on the conductor, whereby a foam insulating layer can be completed simultaneously with the forming.

The foaming agent may be added to the insulating material before feeding into an extruder, or may be added from a foaming agent supply unit mounted on an extruder separately from the supply unit for the insulating material.

One embodiment of the production apparatus of the coaxial cable of the present invention is shown in FIG. 1.

A mixture of a polyolefin resin and a nucleator, which was fed into the primary extruder 4, is melted in the primary extruder 4. A foaming agent is press injected into the primary extruder 4 via a pump 3 and thoroughly mixed with the melt. Then, the mixture of the polyolefin resin, the nucleator and the foaming agent sufficiently mixed in the primary extruder 4 is transferred to the secondary extruder 5.

The extrusion temperature of the secondary extruder 5 is preferably adjusted to a temperature lower than that of the primary extruder 4 and slightly higher than the melt temperature of the polyolefin resin to be used. For example, when a mixture of HDPE and LDPE is used, the temperature and the pressure in the primary extruder 4 are preferably adjusted to 180–210° C., 50–150 atm; and the temperature and the pressure in the secondary extruder 5 are preferably adjusted to 130–140° C., 50–150 atm.

The conductor 8 to be fed from the conductor supply 1 is preheated in a preliminary heater 2. The mixture in the secondary extruder 5 is extruded from the head 9 of the extruder into the die 6, passed through the axial core part of the die 6 and is press-adhered to the periphery of the conductor 8 thus fed. The mixture foams while adhering to the periphery of the conductor. Then, the foamed mixture is gradually cooled to form a foam insulating layer.

The foam insulating layer thus formed is not necessarily in the final state and may undergo a subsequent treatment of, for example, crosslinking and post-foaming treatment.

There is no particular limitation imposed on the structure of the coaxial cable of the present invention. In general terms, a foam insulating layer is formed from the insulating material of the present invention on the periphery of the inner conductor, an outer conductor layer is formed thereon, and a coating layer is further formed thereon.

The thickness of the respective layers mentioned above is not limited. The diameter of the inner conductor is generally about 5–18 mm, that including the inner conductor and the insulating layer is about 11–45 mm, that further including the outer conductor is about 15–47 mm, and the outer diameter of the cable is about 17–51 mm.

The conductor to be used in the present invention is preferably one made from a metallic material such as copper, aluminum and tin, with preference given to copper in terms of conductivity. The conductor may be a wire or a tube.

The insulating material for coaxial cable of the present invention can afford a foamed article having fine and uniform cells, fine appearance and a high expansion ratio. The foamed article is superior in electric properties [small $\epsilon$ (effective dielectric constant) and tan $\delta$, particularly small tan $\delta$]. Addition of excess nucleator does not result in poor electric properties, but rather, in improved electric properties. The foamed article is advantageous in that it can be produced at lower costs than conventional articles.

The foamed article prepared from the insulating material of the present invention has superior electric properties, and the material can be used for the insulating layer of communication antenna feeder line, ITV transmission line, CATV transmission line, and particularly for coaxial cable for high frequency waves of about 1.,5–2.5 GHz.

While the present invention is described in detail by illustration of Examples in the following, the present invention is not limited to these Examples.

EXAMPLES 1–5

An insulating material for coaxial cable was prepared by mixing HDPE (100 parts by weight, density 0.943 g/Cm³, MFR 0.8 g/10 min) and various PTFEs shown in Table 2 at ratios shown in Table 2.

The obtained compositions were subjected to foam extrusion by a two step extruder of 25 mm$\phi$–30 mm$\phi$ using argon gas as a foaming agent, whereby insulating foams having an outer diameter of about 10 mm were obtained.

The tan $\delta$ and maximum expansion ratio (%) of the obtained insulating foams, and average size (mm) and uniformity of the cells are shown in Table 2.

Tan $\delta$ of Insulating Foam

A mixture of polyethylene and a nucleator was fed into a 25 mm$\phi$–30 mm$\phi$ extruder, and foam-extruded on a soft copper wire having a diameter of 0.813 mm while injecting a foaming gas (Ar) from a foaming agent injection inlet separately formed on the extruder, whereby an insulation wire (outer diameter 10 mm) having a foam insulating layer was prepared. A copper wire braid and PVC sheath were formed on the foam insulating layer to give a coaxial cable. A high frequency of 1.06 Hz was applied to the coaxial cable, and tan $\delta$ and $\epsilon$ were calculated from the attenuation thereof. The attenuation is expressed by the following formula.

$$\alpha = \alpha_r + \alpha_k$$

wherein $\alpha$ is attenuation, $\alpha_r$ is resistance attenuation and $\alpha_k$ is leakage attenuation.

$$\alpha_r \text{ (dB/m)} = \frac{3.61}{Zo} \sqrt{f} \left( \frac{K_1}{d} + \frac{K_2 \cdot K_3}{D} \right) \times 10^{-3}$$

$$\alpha_k \text{ (dB/m)} = 9.1 \cdot \sqrt{\epsilon} \cdot \tan \delta \cdot f \times 10^{-3}$$

wherein Zo is characteristic impedance ($\Omega$); f is frequency (Hz); d is outer diameter (m) of inner conductor; D is inner diameter (m) of outer conductor; $\epsilon$ and tan $\delta$ are as described below; $K_1$ and $K_2$ are constants determined by material formulation of inner and outer conductors which are, for example, 1 for copper single wire and copper tube and 1.2 for copper stranded wire; and $K_3$ is a constant determined by the shape of the outer conductor which is, for example, 1.0 for smooth tube and 1.2 for wave tube.

TABLE 1

| Insulation form | ϵ | Tan δ |
|---|---|---|
| polyethylene-filled insulator | 2.3 | $2 \times 10^{-4}$ |
| polyethylene foam-filled insulator | 1.5 | $1.5 \times 10^{-4}$ |
| Teflon-filled insulator | 2.1 | $2 \times 10^{-4}$ |

Maximum Expansion Ratio (%)

The maximum expansion ratio is the greatest of the expansion ratios of insulation foams which are obtained by gradually increasing the amount of the argon gas to be injected into an extruder when preparing an insulating foam, which ratio is calculated by the following formula:

$$\text{Expansion ratio}(\%) = \frac{\text{specific gravity of base resin} - \text{specific gravity of foamed article}}{\text{specific gravity of base resin}} \times 100$$

wherein the specific gravity of the base resin and the foamed article was measured by immersion method (method A) defined in JIS K 7112.

Average Size (mm) of Cell

The cross section of the foamed article was observed, and the longer diameter of 10 cells randomly selected was measured with a caliper. The average length was taken as an average cell size.

Uniformity of Cell

The cross section of the foamed article was visually observed, and evaluated according to the following criteria.

⊚: every cell being of almost the same size
○: small number of larger cells present among average-sized cells
x: the majority being large cells

EXAMPLE 6

In the same manner as in Example 1 except that a 30/70 (weight ratio) mixture of HDPE and LDPE (density 0.92 g/cm$^3$, MFR 2.0 g/10 min) was used instead of HDPE, an insulating material for foam extrusion was prepared, from which an insulating foam having an outer diameter of about 10 mm was prepared.

EXAMPLE 7

In the same manner as in Example 1 except that polypropylene was used instead of HDPE, an insulating material for foam extrusion was prepared, from which an insulating foam having an outer diameter of about 10 mm was prepared.

EXAMPLE 8

In the same manner as in Example 1 except that a 70/30 (weight ratio) mixture of LDPE and PP was used instead of HDPE, an insulating material for foam extrusion was prepared, from which an insulating foam having an outer diameter of about 10 mm was prepared.

COMPARATIVE EXAMPLES 1–7

In the same manner as in Example 1 except that an inorganic nucleator or organic nucleator shown in Table 3 was used instead of PTFE, insulating materials for foam extrusion were prepared, from which insulating foams having an outer diameter of about 10 mm were prepared.

The respective insulating foams obtained in Examples 6–8 and Comparative Examples 1–7 were evaluated for maximum expansion ratio (%), average cell size (mm) and uniformity of cells, and tan δ in the same manner as in Example 1. The results are shown in Tables 2 and 3.

TABLE 2

| Example No. | Ex. 1 | Ex. 2 | Ex. 3 | Ex. 4 | Ex. 5 | Ex. 6 | Ex. 7 | Ex. 8 |
|---|---|---|---|---|---|---|---|---|
| Base resin | | | | | | | | |
| HDPE | 100 | 100 | 100 | 100 | 100 | 30 | | |
| LDPE | | | | | | 70 | | 70 |
| PP | | | | | | | 100 | 30 |
| Fluororesin nucleator | | | | | | | | |
| PTFE (13 μm)* | 0.5 | 1.0 | | | | 0.5 | 0.5 | 0.5 |
| PTFE (7 μm) | | | 0.5 | | | | | |
| PTFE (4 μm) | | | | 0.5 | | | | |
| PTFE (35 μm) | | | | | 0.5 | | | |
| PFA + ETFE | | | | | | | | |
| Tan δ (1 GHz) (× 10$^4$) | 1.4 | 1.3 | 1.4 | 1.4 | 1.4 | 1.4 | 1.3 | 1.4 |
| Maximum expansion ratio (%) | 70.9 | 69.8 | 72.0 | 71.5 | 71.6 | 75.2 | 71.0 | 74.6 |
| Average cell size (mm) | 0.41 | 0.27 | 0.50 | 0.70 | 0.67 | 0.43 | 0.45 | 0.50 |
| Uniformity of cell | ⊚ | ⊚ | ⊚ | ○ | ○ | ⊚ | ⊚ | ⊚ |

*average particle size of PTFE
The amounts of the base resin and nucleator are in parts by weight.

TABLE 3

| Comparative Example No. | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Base resin HDPE | 100 | 100 | 100 | 100 | 100 | 100 | 100 |
| Inorganic nucleator | | | | | | | |
| ZrO$_2$ | 0.5 | | | | | | |
| MgO | | 0.5 | | | | | |
| Si$_3$N$_4$ | | | 0.5 | | | | |
| Al(OH)$_3$ | | | | 0.5 | | | |

TABLE 3-continued

| Comparative Example No. | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Talc |  |  |  |  | 0.5 |  |  |
| BN |  |  |  |  |  | 0.5 |  |
| Organic nucleator ADCA |  |  |  |  |  |  | 0.5 |
| Tan δ (1 GHz) (× $10^4$) | 1.7 | 1.6 | 2.2 | 1.9 | 2.5 | 1.6 | 2.1 |
| Maximum expansion ratio (%) | 69.4 | 72.0 | 72.2 | 68.2 | 73.0 | 71.1 | 72.0 |
| Average cell size (mm) | 1.73 | 1.75 | 0.91 | 1.33 | 0.72 | 0.67 | 0.25 |
| Uniformity of cell | × | × | × | × | ○ | ○ | ⊙ |

*average particle size of PTFE
The amounts of the base resin and nucleator are in parts by weight.

EXAMPLE 9

An insulating material for coaxial cable was prepared by mixing HDPE (100 parts by weight, density 0.943 g/cm³, MFR 0.8 g/10 min) and PTFE at the ratio shown in Table 4.

The obtained composition was foam-extruded on a soft copper wire of 1.4 mm φ by a two step extruder of 25 mm φ–30 mm φ using argon gas as a foaming agent, whereby a coaxial cable (length 110 m, outer diameter about 5 mm) having a foam insulating layer was obtained. A copper wire braid and PVC sheath were formed on the foam insulating layer to give a coaxial cable. A high frequency of 1 GHz, 1.5 GHz or 2 GHz was applied to the coaxial cable, and tan δ was calculated from the attenuation thereof. The maximum expansion ratio, average cell size and uniformity of the cells were determined in accordance with Example 1.

The results are shown in Table 4.

EXAMPLES 10–15

In the same manner as in Example 9 except that polyethylene and the nucleators shown in Table 4 were used, coaxial cables were obtained.

In the same manner as in Example 9, tan δ was calculated. In addition, maximum expansion ratio, average cell size and uniformity of the cells were determined in accordance with Example 1.

The results are shown in Table 4.

TABLE 4

| Example No. | Ex. 9 | Ex. 10 | Ex. 11 | Ex. 12 | Ex. 13 | Ex. 14 | Ex. 15 |
|---|---|---|---|---|---|---|---|
| Base resin |  |  |  |  |  |  |  |
| HDPE | 100 | 100 | 100 | 100 | 100 | 100 |  |
| LDPE |  |  |  |  |  |  |  |
| PP |  |  |  |  |  |  | 100 |
| Fluororesin nucleator |  |  |  |  |  |  |  |
| PTFE (13 μm)* | 0.2 | 0.1 | 0.05 |  |  | 0.01 | 2.0 |
| PTFE (7 μm) |  |  |  |  |  |  |  |
| PTFE (4 μm) |  |  |  |  |  |  |  |
| PTFE (35 μm) |  |  |  |  |  |  |  |
| PFA (7 μm) |  |  |  | 0.5 |  |  |  |
| ETFE (20 μm) |  |  |  |  | 0.5 |  |  |
| Tan δ (1 GHz) (× $10^4$) | 1.4 | 1.4 | 1.3 | 1.4 | 1.4 | 1.3 | 1.3 |
| Maximum expansion ratio (%) | 74.0 | 79.0 | 76.2 | 73.0 | 79.9 | 78.0 | 66.0 |
| Average cell size (mm) | 0.25 | 0.36 | 0.48 | 0.25 | 0.66 | 0.73 | 0.29 |
| Uniformity of cell | ⊙ | ○ | ○ | ⊙ | ○ | ○ | ⊙ |

*average particle size of PTFE
The amounts of the base resin and nucleator are in parts by weight.

EXAMPLES 16–20, COMPARATIVE EXAMPLES 8–10

In the same manner as in Example 9 except that polyethylene and the nucleators shown in Table 5 were used, coaxial cables were obtained.

In the same manner as in Example 9, tan δ was calculated.

The results are shown in Table 5.

TABLE 5

| | Ex. 16 | Ex. 17 | Ex. 18 | Ex. 19 | Ex. 20 | Ex. 21 | Comp. Ex. 8 | Comp. Ex. 9 | Comp. Ex. 10 |
|---|---|---|---|---|---|---|---|---|---|
| Base resin |  |  |  |  |  |  |  |  |  |
| HDPE | 100 | 100 | 100 | 100 | 100 | 30 | 100 | 100 | 100 |
| LDPE |  |  |  |  |  | 70 |  |  |  |

TABLE 5-continued

|  | Ex. 16 | Ex. 17 | Ex. 18 | Ex. 19 | Ex. 20 | Ex. 21 | Comp. Ex. 8 | Comp. Ex. 9 | Comp. Ex. 10 |
|---|---|---|---|---|---|---|---|---|---|
| Fluororesin nucleator |  |  |  |  |  |  |  |  |  |
| PTFE | 0.1 | 0.5 | 1.0 |  |  | 0.5 |  |  |  |
| PFA |  |  |  | 0.5 |  |  |  |  |  |
| ETFE |  |  |  |  | 0.5 |  |  |  |  |
| Inorganic nucleator boron nitride |  |  |  |  |  |  | 0.5 |  |  |
| Organic nucleator |  |  |  |  |  |  |  |  |  |
| ADCA |  |  |  |  |  |  |  | 0.5 |  |
| OBSH |  |  |  |  |  |  |  |  | 0.5 |
| Tan δ | ○ | ○ | ○ | ○ | ○ | ○ | × | × | × | tan δ: ○ less than 1.5
× not less than 1.5

The insulating material for coaxial cables of the present invention containing a fluororesin powder such as PTFE as a nucleator provides a foamed article having fine and uniform cells, and a high expansion ratio. Such foamed article is superior in electric properties, particularly insulation property, and the coaxial cable having such insulating layer is superior in attenuation property. The material of the invention can obviate drying of the insulating layer, which contributes to an improved production efficiency of the coaxial cable and reduced production cost. In addition, the insulating material of the present invention is beneficially economical.

What is claimed is:

1. A coaxial cable comprising a foam insulating layer of a material comprising (a) a polyolefin resin of heat-melt extrusion, said polyolefin resin selected from the group consisting of (i) a high density polyethylene and (ii) a mixture of high density polyethylene and a low density polyethylene, and (b) a fluororesin powder as a nucleator, wherein the polyolefin resin is foam extruded in the presence of a foaming agent, and wherein the fluororesin powder is provided in a proportion of at most about 10 parts by weight per 100 parts by weight of the polyolefin resin.

2. The coaxial cable of claim 1, wherein the insulating material for coaxial cable further comprises a foaming agent.

3. The coaxial cable of claim 1, wherein the fluororesin powder is a member selected from the group consisting of polytetrafluoroethylene powder, tetrafluoroethylene-perfluoroalkylvinylether copolymer powder and ethylene-tetrafluoroethylene copolymer powder.

4. The coaxial cable of claim 1, wherein the fluororesin powder is added in a proportion of 0.01–10 parts by weight relative to 100 parts by weight of the polyolefin resin.

5. The coaxial cable of claim 1, wherein an average particle size of the fluororesin powder is 0.1–100 μm.

6. The coaxial cable of claim 1, which is for high frequency waves of 1.5–2.5 GHz.

7. The coaxial cable of claim 1, wherein the high density polyethylene has a density exceeding 0.940 g/cm$^3$ and not more than 0.965 g/cm$^3$, and the low density polyethylene has a density of not less than 0.910 g/cm$^3$ and not more than 0.925 g/cm$^3$.

8. The coaxial cable of claim 1, wherein the mixture comprises the low density polyethylene in a proportion of 10–900 parts by weight per 100 parts by weight of the high density polyethylene.

9. The coaxial cable of claim 1, wherein the insulating layer exhibits a tan δ of less than 1.5.

* * * * *